May 5, 1953 G. B. ARNOLD ET AL 2,637,681
FRACTIONAL SEPARATION OF WAX FROM A HYDROCARBON MIXTURE USING AN ORGANIC COMPLEXING AGENT AND A SOLVENT
Filed Dec. 9, 1948
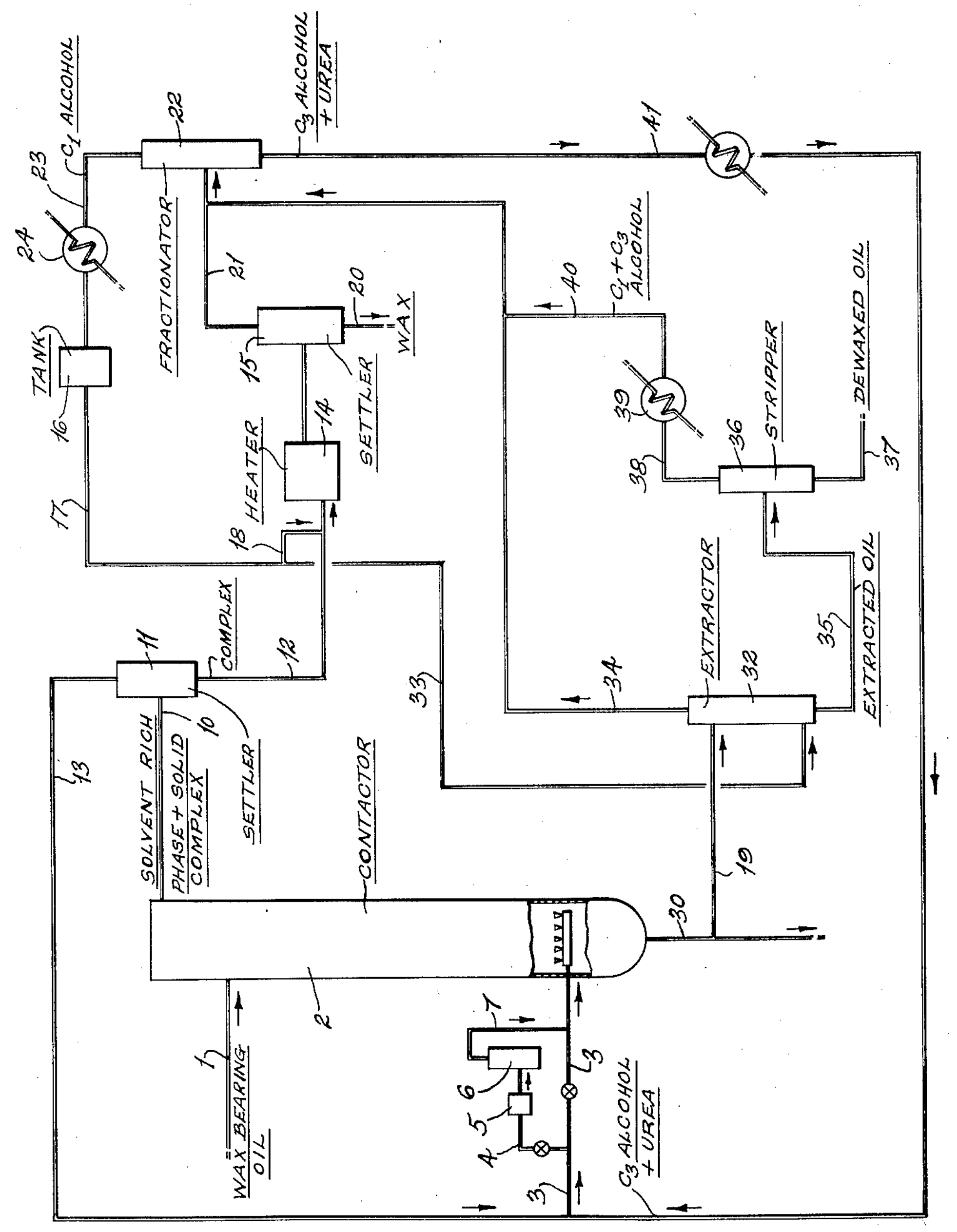
INVENTORS
GEORGE B. ARNOLD
HOWARD V. HESS
WILLIAM E. SKELTON
BY Daniel Stryker
J. H. Grahame
ATTORNEYS Patented May 5, 1953

2,637,681

UNITED STATES PATENT OFFICE 2,637,681

FRACTIONAL SEPARATION OF WAX FROM A HYDROCARBON MIXTURE USING AN ORGANIC COMPLEXING AGENT AND A SOLVENT

George B. Arnold, Glenham, and Howard V. Hess and William E. Skelton, Beacon, N. Y., assignors to The Texas Company, New York, N. Y., a corporation of Delaware Application December 9, 1948, Serial No. 64,272

4 Claims. (Cl. 196—17)

1

This invention relates to the treatment of oil such as hydrocarbon mixtures and the like, to effect separation therefrom of constituents which, under suitable conditions in the presence of a complexing agent such as urea and a solvent liquid, form crystal complexes with the aforesaid agent which are separable from the mixture undergoing treatment.

The invention broadly contemplates subjecting the feed mixture to contact with an organic complexing agent, such as urea, in the presence of a solvent liquid, advantageously a polar compound such as a low molecular weight aliphatic alcohol, which is at least partially miscible with the agent. Contact is effected under such conditions that there occurs formation of a solvent-rich liquid phase, an oil-rich liquid phase and a solid complex of the agent and certain hydrocarbons contained in the solvent-rich phase. These phases are separately removed from the zone of contact and separately treated to recover solvent and organic amide therefrom.

An effective complexing agent possesses the following chemical structure:

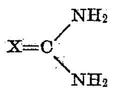

where X may be either oxygen or sulfur. Examples are urea and thiourea.

The solvent-rich phase obtained in the dewaxing of mineral oil with urea, for example, can be subjected to stratification in a settler, thickening in a conventional thickener, or to filtering to effect separation of solid complex of urea and paraffins from the main body of solvent liquid, and the residual solvent liquid containing some urea is advantageously recycled to the contact zone. The removed complex can be decomposed by heating, by addition of water with or without heating, or preferably by contacting with a hot urea solvent or a hot oil solvent.

The complex is a definite chemical compound consisting of about 25% wax and 75% urea by weight. The crystal structure appears to involve a hexagonal system. Complex formation is facilitated by the presence of a small amount of alcohol, water or other liquid containing a hydroxyl group. The complex is formed at ordinary temperatures and may be decomposed by heating to temperatures of 150 to 180° F. or by treating with hot alcohol.

Some oil may be retained in the complex and therefore it is contemplated that the complex may be subjected to washing or the complex may

2 be repulped with a suitable oil solvent, such as benzene, light naphtha, pentane or other low-boiling hydrocarbons. The repulped mixture can be subjected to settling, centrifuging or filtration to obtain an oil-free complex which can then be decomposed, as already described, to yield substantially oil-free wax.

The oil-rich phase can be subjected to distillation or preferably first to washing with a solvent liquid having high solubility, such as methanol, for the urea, and the resulting washed oil then distilled to strip residual solvent therefrom to yield dewaxed oil.

Besides dewaxing of mineral oil or fractions thereof, the invention has application to the deoiling of wax concentrates or fractions thereof as well as to the treatment of oils derived from animal and vegetable sources, in order to effect a separation of the components.

Suitable solvents comprise alcohols, ketones, glycols, amines, esters, aldehydes, dioxane, water, ammonia, etc. Aliphatic alcohols having from 1 to 5 or more carbon atoms per molecule are contemplated, although either straight chain or branched chain alcohols or alcohols containing an aromatic ring may be employed; also alcohols diluted with water or with other modifying agents.

In order to describe the method of operation in more detail, reference will now be made to the flow diagram illustrated in the accompanying drawing.

A wax distillate having a Saybolt Universal viscosity at 100° F. of 40 seconds, a pour test of +50° F. and containing about 3.0% by volume of wax is conducted from a source not shown through pipe 1 to the upper portion of a contacting tower 2 at a temperature in the range about 70 to 125° F. This column or tower may be provided with trays, packing or other suitable contacting material.

A stream of isopropyl alcohol saturated with urea at a temperature of about 70 to 125° F. is conducted through a pipe 3 leading to the lower portion of the contactor 2. Preferably this stream of solvent is at least saturated with urea and advantageously may contain a substantial amount of urea in excess of that required to saturate the alcohol at the temperature prevailing in the system. All or a portion of the alcohol can be diverted through a pipe 4 and heater 5 into a drum 6 packed with solid urea. The alcohol stream flows through the mass of urea, effecting solution thereof and the effluent stream saturated with urea at the temperature prevailing in the heater 5 flows through pipe 7 back into the pipe 3. The amount of urea contained in the stream entering the contact tower 2 can thus be controlled or regulated by adjusting the temperature of the heater 12.

At a temperature of about 100° F. a saturated solution of urea in isopropyl alcohol contains about 5.1 weight per cent of urea. Conditions may be maintained such that the urea content of the alcohol entering the bottom of the contact tower 2 will range from 5 to 25% and higher.

The alcohol charged to the tower 2 may amount to about 1 volume per 2 volumes of feed oil.

The alcohol, being less dense than the feed oil, rises through the column countercurrently to and in direct contact with the downwardly flowing oil. It will be understood, of course, that in the event that the density of the solvent employed is greater than that of the oil undergoing treatment, the points of introduction for solvent and oil, respectively, will be reversed.

As a result of contact between the wax constituents of the oil and urea in the presence of the alcohol, a crystalline chemical compound is formed. Complete formation readily occurs at about 100° F. although temperatures somewhat below or somewhat above this may be employed in the column.

An alcohol-rich liquid phase containing the solid complex wet with alcohol collects in the upper zone of the column, while an oil-rich liquid phase collects in the lower zone. The alcohol, rising upwardly through the column subjects the downwardly flowing oil to a washing action which displaces complex from the oil, causing the complex to rise within the column.

The solvent-rich phase plus complex is continuously withdrawn through a pipe 10 into a decanter 11 wherein stratification occurs. The complex material settles out of the main body of solvent and is drawn off through a pipe 12. The residual solvent containing urea and some oil is drawn off through pipe 13 and is recycled to the contact column 2 as indicated.

The complex removed through pipe 12 comprising the crystalline chemical compound between wax and urea is conducted through a heater 14 to a decanter 15. Methyl alcohol conducted from a tank 15 through pipes 17 and 18 is injected into the complex flowing through pipe 12 in the proportion of about 1 to 5 volumes of methyl alcohol per volume of complex. The resulting mixture is heated to a temperature of about 180° F. and undergoes stratification in the decanter 15, forming a bottom layer of wax, free or substantially free, from urea and an upper layer of methyl alcohol containing urea, isopropyl alcohol and a small amount of oil removed from the wax. This wax amounts to about 3% by volume of the feed oil.

The wax is discharged through pipe 20. The methyl alcohol solution is removed through pipe 21 and conducted to a fractionator 22. This fractionator is operated so as to distill methyl alcohol from the isopropyl alcohol and urea. The methyl alcohol distillate is removed through pipe 23 and condenser 24 to the aforementioned storage tank 16.

The residual stream of isopropyl alcohol and urea is drawn off from the bottom of the fractionator 35 through pipe 38 by which it can be returned to pipe 10 for reuse in the contacting zone.

The oil-rich phase collecting in the bottom of the contact column 2 is continuously drawn off through a pipe 30 and advantageously conducted through pipe 31 to an extraction column 32 wherein it is subjected to countercurrent washing with a stream of methyl alcohol introduced from tank 16 through pipe 33, as indicated. The washing effects extraction of urea from the oil and the resulting solution of urea in methyl alcohol is removed through pipe 34 and conducted to the fractionator 22.

The washed oil, retaining a substantial amount of isopropyl alcohol, is removed from the extractor 32 through a pipe 35 to a stripper 36 wherein the alcohol is stripped from the oil. The oil is discharged through pipe 37, while the alcohol distillate comprising methyl, as well as isopropyl, alcohol is drawn off through pipe 38, condenser 39 and pipe 40 which connects with pipe 34 and by which the condensed alcohol stream is passed to the fractionator 22.

The oil discharged through pipe 37 amounts to about 97% by volume of the feed oil and has a pour test of minus 5° F.

The liquid drawn off from the bottom of the fractionator 22 is a concentrated solution of urea in isopropyl alcohol and is passed through pipe 41 to pipe 3 for return to the system.

The contacting tower 2 may be of conventional packed type or may be substantially free from packing. Provision may be made for drawing off one or more streams at intermediate points and for injecting additional complexing agent at intermediate points.

If desired, the wax-oil feed may be diluted with aromatic hydrocarbons, such as benzene, toluene, xylene, or mixtures thereof, prior to introduction to the column 2 in order to facilitate effective contact between the wax-bearing oil and the urea saturated solvent. The diluent may be a suitable petroleum naphtha or naphtha hydrocarbon mixture or a low-boiling hydrocarbon, such as propane, butane, pentane, isopentane, etc.

The use of the diluent is advantageous in the event that it is desired to subject either the solvent-rich phase or the oil-rich phase removed from the column 2 to a subsequent filtration. The oil-rich phase may under certain conditions retain a substantial amount of complex or crystallized material, and dilution with a low molecular weight hydrocarbon solvent may be advantageous in order to effect removal of the crystalline material by filtration.

Likewise, it may be desirable to subject the complex removed from the decanter 11 to filtering, in which case the complex may be diluted with a low molecular weight hydrocarbon or an aromatic hydrocarbon, such as benzene, to dissolve the small amount of retained oil and facilitate its removal by filtration.

If desired, this withdrawn complex can be subjected to continuous countercurrent flow washing with a low molecular weight hydrocarbon, such as a $C_4$ or a $C_5$ hydrocarbon, to extract retained oil therefrom. The wash solution is removed and separately distilled to separate low molecular weight hydrocarbon from the oil, the former being recycled for washing additional complex.

The process of this invention may be applied to the removal of residual wax from a wax-bearing oil that has previously been subjected to dewaxing by conventional filtration or centrifuging in the presence of a diluent or solvent at low temperature and thus effect a further reduction in the pour point of the oil. On the other hand, the process of this invention may be used to effect a preliminary removal of wax such as a selected fraction of the wax prior to conventional dewaxing. The wax-oil feed in the process of this invention may be a mixture of relatively wide boiling range or may be a mixture of relatively narrow boiling range, such as the individual fractions obtained by fractional distillation of a wax distillate. It may be applied to the separation of oil from slack wax or wax concentrates.

As already described, when dewaxing with urea in the presence of a low molecular weight alcohol, the resulting complex remains in the alcohol phase or layer, and this layer, being less dense, rises to the top of the column. If desired, the alcohol solution may be modified so that the solvent layer is more dense and therefore descends to the bottom of the column, while the oil layer rises to the top. Suitable modifying solvents are glycols, esters, aniline, etc.

Although removal of wax or relatively high molecular weight hydrocarbons by complexing has been specifically described, it is contemplated using the process for separating material of olefin, aromatic and naphthenic character from hydrocarbon mixtures. Normal olefins enter into complex formation. Aromatics and naphthenes having long aliphatic side chains form complexes with urea.

According to a further modification of the invention, simultaneous removal of wax and resins may be effected. This can be accomplished by employing a high molecular weight alcohol, such as amyl alcohol, the presence of which in the contacting zone would effect precipitation of resins and asphaltic constituents from the oil.

While the process has been described with particular reference to the treatment of wax distillate, neverthelsss it is contemplated that other petroleum fractions may be charged, including residual lubricating oil fractions and relatively low-boiling fractions such as gas oils or oils useful in the manufacture of Diesel oil or light lubricants for refrigerators and turbines.

Obviously many modifications and variations of the invention, as hereinbefore set forth, may be made without departing from the spirit and scope thereof, and therefore only such limitations should be imposed as are indicated in the appended claims.

We claim:

1. A continuous method of separating wax from a hydrocarbon mixture by treatment with a wax-complexing agent having the structure $$X=C\begin{matrix} \diagup NH_2 \\ \diagdown NH_2 \end{matrix}$$

where X is selected from the group consisting of oxygen and sulfur, which comprises passing a stream of said hydrocarbon mixture into the upper portion of a contacting tower maintained at a complexing temperature in the range about 70° F. to 125° F., passing a stream of $C_3$ alcohol at least saturated with said agent at the tower temperature, into the lower portion of said tower, effecting continuous counter-current contact therein between downflowing hydrocarbons and upflowing alcohol-containing complexing agent such that said agent enters into complex formation with wax constituents of the hydrocarbon feed mixture, removing from the top of said tower a stream of $C_3$ alcohol-rich phase containing solid complex, removing from the bottom of said tower a stream of oil-rich phase containing some complexing agent and $C_3$ alcohol, decanting at least some $C_3$ alcohol from removed alcohol-rich phase to leave a complex concentrate, treating resulting concentrate with $C_1$ alcohol at an elevated temperature sufficient to liberate wax from complexing agent and residual $C_3$ alcohol discharging liberated wax, passing a mixture of complexing agent, $C_1$ and $C_3$ alcohols from which wax has been removed to a fractional distillation zone, subjecting the aforementioned removed oil-rich phase to counter-current contact with $C_1$ alcohol such that retained complexing agent is extracted therefrom as an extract solution in $C_1$ alcohol leaving extracted oil retaining some $C_1$ and $C_3$ alcohols, distilling said $C_1$ and $C_3$ alcohols from the extracted oil, passing resulting distillate and said extract solution to the aforesaid fractional distillation zone, distilling $C_1$ alcohol from said distillation zone leaving a residual liquid concentrate of complexing agent, and recycling both said residual liquid concentrate and aforesaid decanted $C_3$ alcohol to the lower portion of said contacting tower.

2. The method according to claim 1 in which the hydrocarbon mixture passing to the upper portion of said contact tower is diluted with an anti-solvent liquid for asphaltic and resinous constituents of wax-bearing mineral oil.

3. A continuous method of separating wax from a hydrocarbon mixture by treatment with a wax-complexing agent having the structure $$X=C\begin{matrix} \diagup NH_2 \\ \diagdown NH_2 \end{matrix}$$

where X is selected from the group consisting of oxygen and sulfur, which comprises passing a stream of said hydrocarbon mixture into the upper portion of a contacting tower maintained at a complexing temperature in the range about 70° F. to 125° F., passing a stream of $C_3$ alcohol at least saturated with said agent at the tower temperature, into the lower portion of said tower, effecting continuous countercurrent contact therein between downflowing hydrocarbons and upflowing alcohol-containing complexing agent such that said agent enters into complex formation with wax constituents of the hydrocarbon feed mixture, removing from the top of said tower a stream of $C_3$ alcohol-rich phase containing solid complex, removing from the bottom of said tower a stream of oil-rich phase containing some complexing agent and $C_3$ alcohol, decanting at least some $C_3$ alcohol from removed alcohol-rich phase to leave a complex concentrate, treating resulting concentrate with $C_1$ alcohol at an elevated temperature sufficient to liberate wax from complexing agent and residual $C_3$ alcohol, discharging liberated wax, passing a mixture of complexing agent, $C_1$ and $C_3$ alcohols from which wax has been removed to a fractional distillation zone, subjecting the aforementioned removed oil-rich phase to countercurrent contact with $C_1$ alcohol such that retained complexing agent is extracted therefrom as an extract solution in $C_1$ alcohol leaving extracted oil retaining some $C_1$ and $C_3$ alcohols, distilling said $C_1$ and $C_3$ alcohols from the extracted oil, passing resulting distillate and said extract solution to the aforesaid fractional distillation zone, distilling $C_1$ alcohol from said distillation zone leaving a residual liquid concentrate of complexing agent, commingling said residual liquid concentrate with aforesaid decanted $C_3$ alcohol to form a stream of $C_3$ alcohol substantially saturated with complexing agent at a temperature of about 70° F. to 125° F., diverting a portion of the commingled stream, passing the diverted stream portion in contact with fresh complexing agent under conditions of temperature such that a further quantity of complexing agent is dissolved in the diverted stream, and passing the diverted stream containing additional complexing agent into admixture with the remaining portion of said stream of $C_3$ alcohol substantially saturated with complexing agent to form a mixed stream containing at least from about 5 to 25% complexing agent and thereby provide the aforesaid stream of $C_3$ alcohol and complexing agent passing into the lower portion of the contacting tower.

4. The method according to claim 3 in which the hydrocarbon mixture passing to the upper portion of said contact tower is diluted with an anti-solvent liquid for asphaltic and resinous constituents of wax-bearing mineral oil.

GEORGE B. ARNOLD.
HOWARD V. HESS.
WILLIAM E. SKELTON.

References Cited in the file of this patent

UNITED STATES PATENTS

| Number | Name | Date |
|---|---|---|
| 2,045,742 | Winning et al. | June 30, 1936 |
| 2,301,965 | Mauro et al. | Nov. 17, 1942 |
| 2,302,657 | Dons et al. | Nov. 17, 1942 |
| 2,499,820 | Fetterly | Mar. 7, 1950 |

OTHER REFERENCES

Technical Oil Mission, Reel 143, translation of Shell Development Co., of German application B 190,197 deposited in Library of Congress, May 22, 1946 (included in Index released May 31, 1946). (5 pages, pp. 2–6 inclusive only.)